No. 636,837. Patented Nov. 14, 1899.
G. A. NUSSBAUM.
STEAM GENERATOR.
(Application filed Dec. 7, 1898.)
(No Model.) 5 Sheets—Sheet 1.
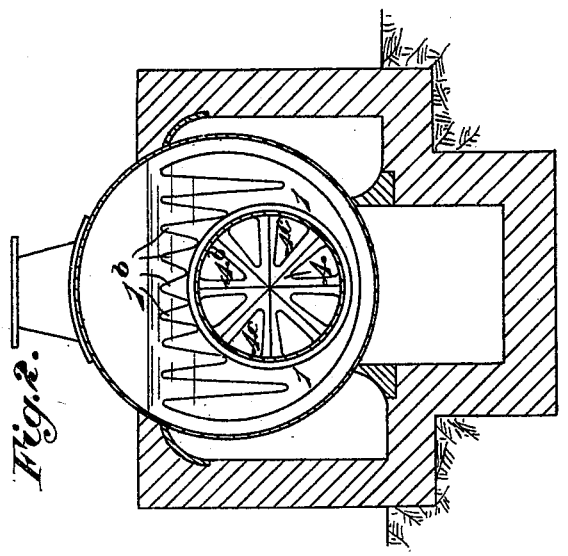
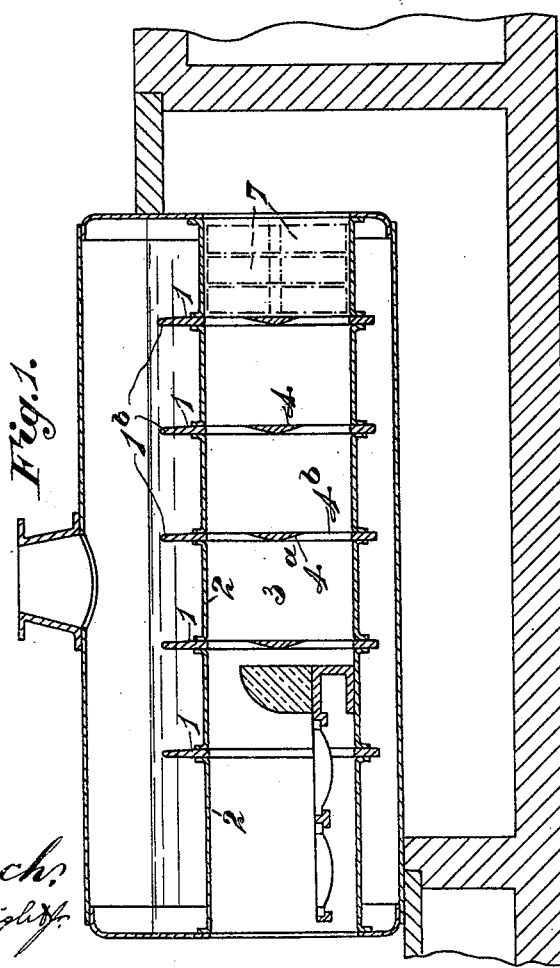
Witnesses
Geo. E. Fuch
Chas. R. Wright
Inventor
G. A. Nussbaum
per
Hubert E. Peck
atty No. 636,837. Patented Nov. 14, 1899.
G. A. NUSSBAUM.
STEAM GENERATOR.
(Application filed Dec. 7, 1898.)
(No Model.) 5 Sheets—Sheet 2.
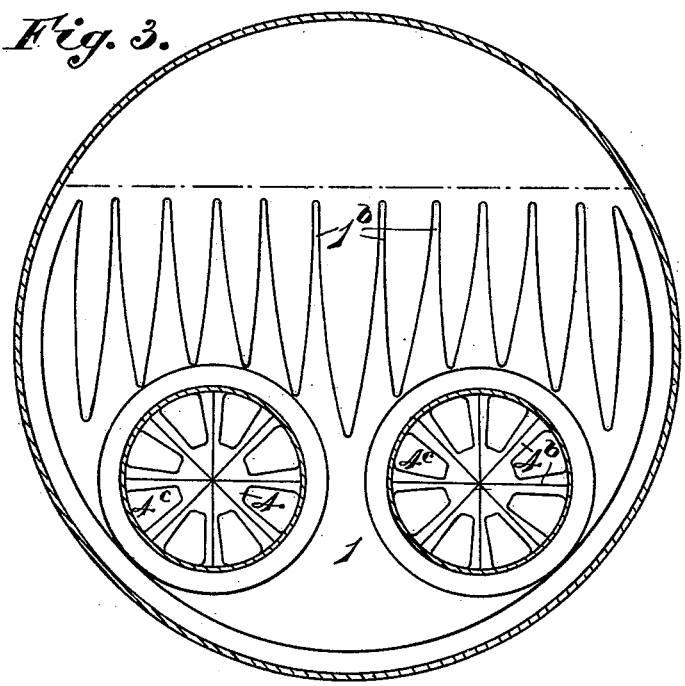
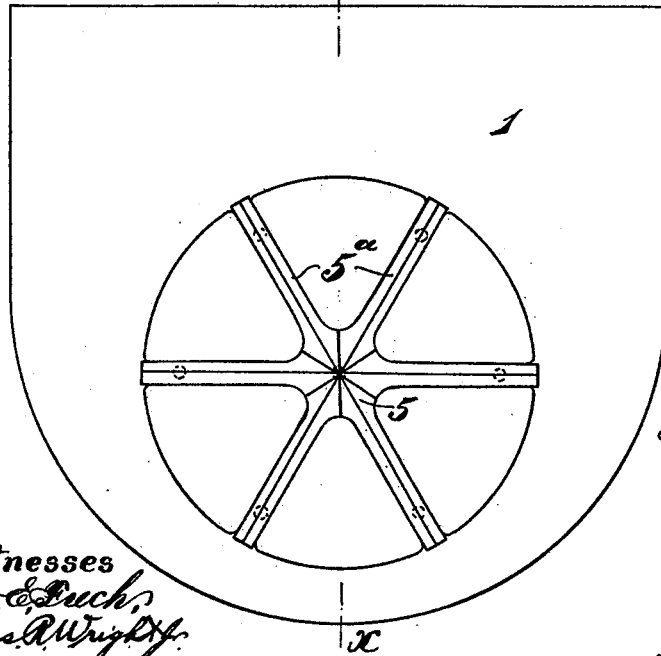
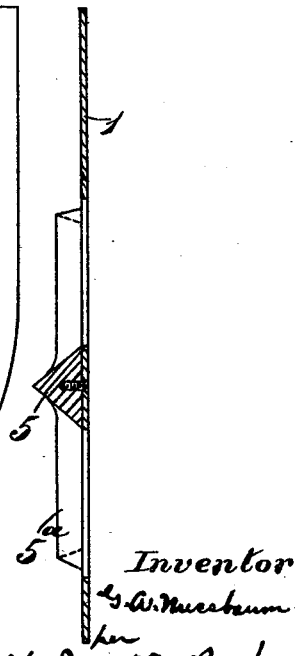

No. 636,837. Patented Nov. 14, 1899.
G. A. NUSSBAUM.
STEAM GENERATOR.
(Application filed Dec. 7, 1898.)
(No Model.) 5 Sheets—Sheet 3.
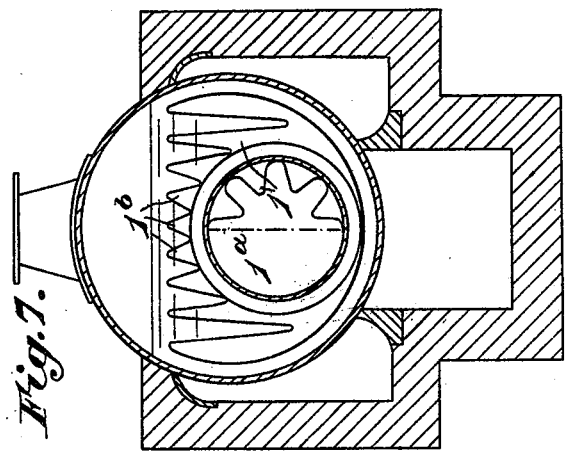
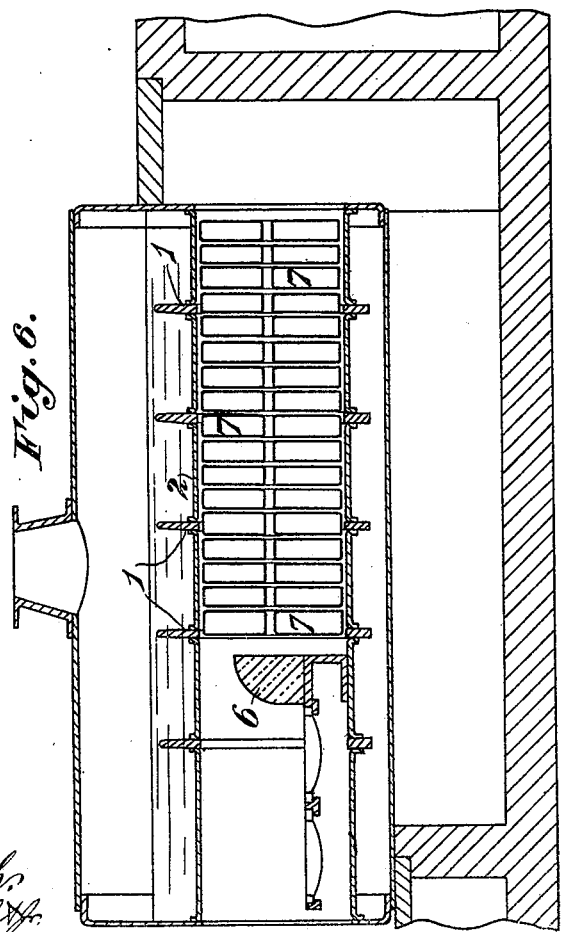
Witnesses
Geo. E. Frech
Chas. R. Wright Jr.
Inventor
G. A. Nussbaum No. 636,837. Patented Nov. 14, 1899.
G. A. NUSSBAUM.
STEAM GENERATOR.
(Application filed Dec. 7, 1898.)
(No Model.) 5 Sheets—Sheet 4.
Fig. 8.
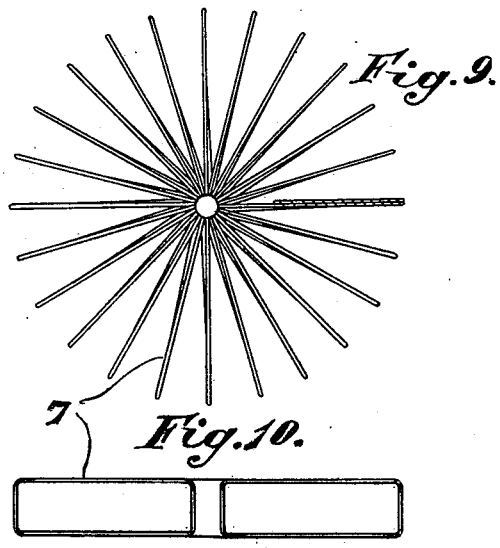
Fig. 9.
Fig. 10.
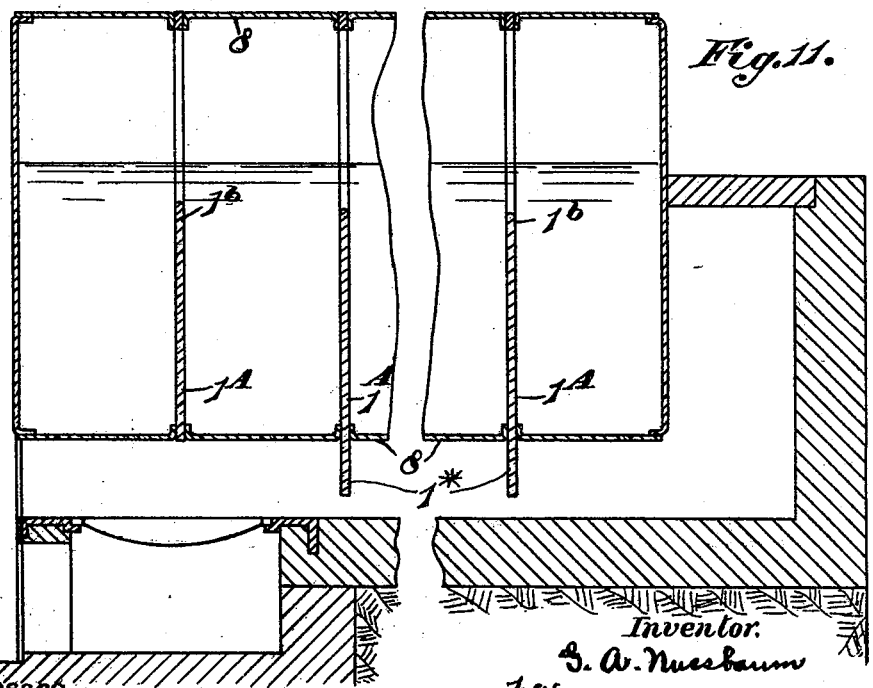
Fig. 11.
Witnesses
Inventor.
G. A. Nussbaum
per Hubert E. Peck atty
THE NORRIS PETERS CO., PHOTO-LITHO., WASHINGTON, D. C.

No. 636,837. Patented Nov. 14, 1899.
G. A. NUSSBAUM.
STEAM GENERATOR.
(Application filed Dec. 7, 1898.)
(No Model.) 5 Sheets—Sheet 5.
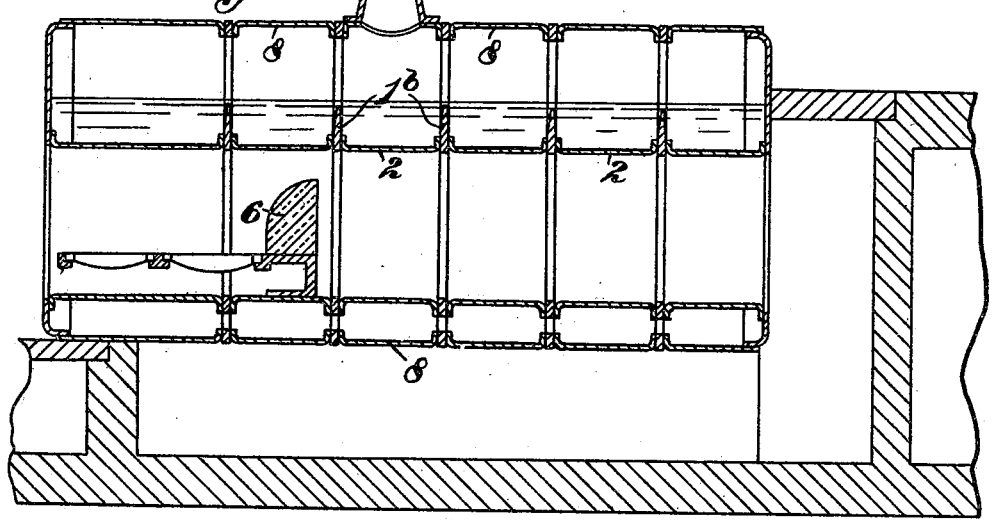
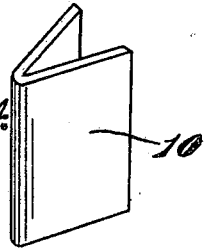
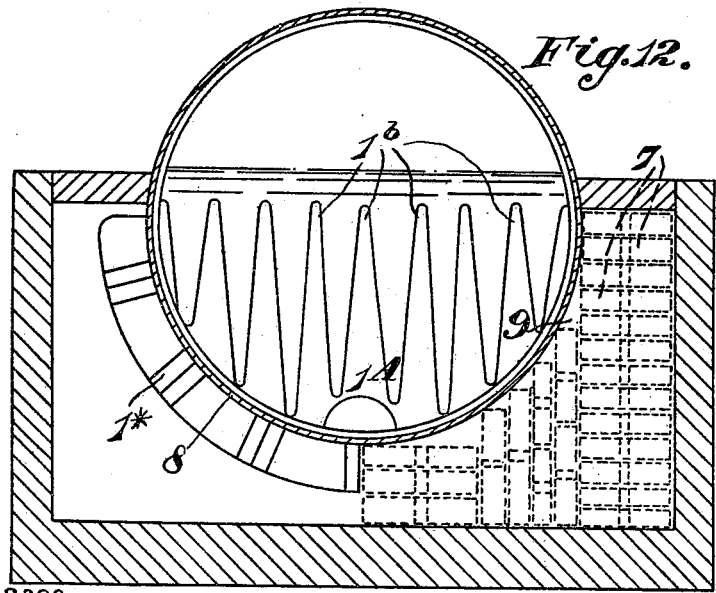

UNITED STATES PATENT OFFICE.

GUILLAUME ARNAUD NUSSBAUM, OF LONDON, ENGLAND.

STEAM-GENERATOR.

SPECIFICATION forming part of Letters Patent No. 636,837, dated November 14, 1899.

Application filed December 7, 1898. Serial No. 698,566. (No model.)

*To all whom it may concern:*

Be it known that I, GUILLAUME ARNAUD NUSSBAUM, a subject of the Queen of Great Britain and Ireland, residing at Ludgate Hill, London, England, have invented Improvements in Steam-Generators, of which the following is a specification.

This invention has reference to improvements in steam-generators of the Cornish, Lancashire, marine, and like types, in which steam is generated in a large cylindrical vessel; and it has for its object to provide for a better and quicker transmission of heat from the flame and hot gases to the water than heretofore usual in such steam-generators, and consequently to increase the evaporative efficiency of the generators. For this purpose the flue or shell of the steam-generator, according as it is fired internally or externally, is constructed with a number of transversely-arranged heat-conducting plates or bodies that form part of and extend from the heating-surface of the steam-generator into the water-space thereof, so as to present a very large heating-surface to the water, and in conjunction with such plates or bodies there are or may be employed mixing and heating devices so constructed and arranged in the furnace-flue as while not offering undue resistance to the flow of hot gas and air through such flue will intimately mix such hot gases and air so as to effect efficient combustion thereof, and will also act to conduct heat to the heat-conducting plates or bodies and other parts of the steam-generator and also to bring the hot gases into effective contact with the heating-surface of the generator.

Figures 1 and 2 of the accompanying illustrative drawings show, respectively, in longitudinal section and cross-section a steam-generator of the Cornish type constructed according to this invention. Fig. 3 shows in cross-section a steam-generator of the Lancashire type according to this invention. Fig. 4 shows in face view, and Fig. 5 in cross-section, on the line $x$ $x$ of Fig. 4, one of the heat-conducting plates or bodies shown in Figs. 1 and 2, together with an air-deflecting device attached thereto. Figs. 6 and 7 are similar views to Figs. 1 and 2, respectively, showing a modified construction. Fig. 8 is a part plan of a plate showing a modification. Figs. 9 and 10 show, respectively, in end elevation and longitudinal section a mixing and heating device, hereinafter more particularly referred to. Figs. 11 and 12 show, respectively, in longitudinal section and cross-section an externally-fired steam-generator according to this invention. Fig. 13 is a longitudinal section showing a further modification. Fig. 14 is a detail view.

For internally-fired steam-generators the heat-conducting bodies consist, according to the construction shown in Figs. 1, 2, and 3, of transversely-arranged metal plates 1, formed with one or more perforated portions, according as the generator is of the Cornish, Figs. 1 and 2, Lancashire, Fig. 3, or multi-flue marine type, the said plates being secured between short flue tubes or rings 2, so as to form therewith the furnace flue or flues 3. The perforated portion, or each such portion, of each plate 1 may be of wheel-like shape, as shown in Figs. 1 to 5, inclusive—that is to say, it may comprise a central hub or boss-like part 4, provided, preferably, with a coned or outwardly and backwardly inclined surface $4^a$ and a number of connecting arms or bars $4^b$, with interposed sector or other shaped openings $4^c$ for hot gases and air.

As it will be advantageous to stamp, cut, or otherwise form the plates 1 out of flat plate metal, there may advantageously be attached to the hub or boss-like part 4 and arms or bars $4^b$, as shown in Figs. 4 and 5, a separate correspondingly or star-shaped air-deflecting device of suitable material—for example, cast-iron—the center 5 of which is conical and the arms $5^a$ of which are of triangular section, the inclined sides being arranged as shown, so as to deflect the air and hot gases outward against the wall of the furnace-flue, or the surface of the arms $5^a$ or of the arms $4^a$, if the separate deflecting device be not used, may be made helical or screw-like, so as to impart a rotary motion to the hot gases and air flowing through the furnace-tube, or there may be in each plate 1 for each flue a single large hole $1^a$, Figs. 6 and 7, having, as shown at the left-hand side of Fig. 7, a plane periphery that may be of the same diameter as or less than that of the flue tubes or rings 2, or, as shown at the right-hand side of the said Fig. 7, a toothed or corrugated periphery. The portion of each plate within the water-space of the steam-generator extends upward near to or above the water-level and serves to provide a large heating-surface. Such portion of the plate may be divided so as to form a number of long vertical, taper, or other shaped teeth or projections $1^b$, Figs. 2 and 3, so that the plate somewhat resembles a comb, or the plate may be left flat and plain, as shown in Figs. 4 and 5, or the portion of the plate in the water-space may be corrugated, as shown in plan in Fig. 8.

When the heat-conducting plates 1 are formed with one or more large flue-holes $1^a$, Figs. 6 and 7, there are or may be provided in conjunction with such plates that are behind the fire-bridge 6 or some of them open-work metallic mixing and heating devices 7, composed of metal, such as wire, constructed and arranged substantially as described with reference to and shown in the specification of another application for Letters Patent filed by me March 31, 1898, Serial No. 675,918. These devices may conveniently be composed of a number of sections arranged side by side and each made of wire wound into a coil having a rectangular, circular, or other section and then bent to a circular shape, the ends of the coil being connected together, so as to form a circular wirework device having a number of convolutions extending more or less in a radial direction from a center, as shown in Figs. 9 and 10, which represents a wire device of the kind referred to of rectangular section. Such wirework mixing and heating devices may be placed in the chimney end of the furnace-flues, (shown in Figs. 1, 2, and 3,) as shown at the right-hand end of Fig. 1.

In externally-fired steam-generators the heat-conducting bodies consist, according to the construction shown in Figs. 11 and 12, of transversely-arranged plates or rings $1^A$, secured between annular portions 8 of the boiler-shell and provided at their lower portions with long tooth-like or projecting parts $1^a$, that extend upward within the water-space near to the water-level, and with other tooth-like or projecting parts $1^b$, that extend into the flue 9 below the steam-generator, or these latter tooth-like or projecting parts $1^b$ may be dispensed with, in which case open-work metallic mixing and heating devices of the kind hereinbefore referred to may be arranged in the flue 9, as shown in dotted lines at the right-hand side of Fig. 12, so as to be in conductive contact with the heat-conducting bodies 1 and the shell 8 of the generator.

The heat-conducting plates or bodies 1 may be of cast or wrought metal. They may advantageously be of copper, or some—say those nearest the furnace—may be of iron and the remainder be of copper, so as to equalize the evaporation along the length of the generator. Such plates or bodies, besides acting as heat-conductors, will serve to greatly strengthen the flue or shell of the boiler of which they form part. They may in some cases, as shown in Fig. 13, extend right across the generator and be secured between annular sections 8 of the outer shell, as well as between the rings 2, composing the flue or flues when these are used, so as in each case to divide the water and steam space of the generator into a number of adjacent compartments that may be connected at the top by holes $1^x$ in the several plates or by external pipes. In this way the generator can be made very strong as well as efficient.

In order to prevent rapid destruction of the star-shaped air-deflectors 4 $4^a$ or 5 $5^a$ or $1^x$ nearest the furnace by the heat and scouring action of flame and hot gases, such deflectors may be protected by removable pieces 10 of metal bent to an angular section, as shown in Fig. 14.

What I claim is—

1. A steam-generator of the kind herein referred to provided with a number of transversely-arranged heat-conducting plates or bodies that form part of the heating-surface of the generator and extend upward between the sections of the flue and into the water-space of the generator near to or above the normal water-level, substantially as described for the purpose specified.

2. A steam-generator of the kind herein referred to having a number of transverse heat-conducting plates arranged to extend from the furnace-flue upward between the sections of the flue and into the water-space of the generator, and mixing and heating devices arranged in the furnace-flue in conductive contact with said plates and adapted while not offering undue resistance to the flow of hot gases and air through such flue, to intimately mix such hot gases and air and cause them to come into contact with the heating-surface of the generator, substantially as described.

3. A steam-generator of the kind herein referred to provided with a number of transverse heat-conducting plates arranged to form part of the heating-surface of the generator and to extend upward between the sections of the flue and into the water-space thereof, the portion of each plate extending into the water-space being divided so as to form a number of vertical teeth or projections, substantially as described.

4. A steam-generator of the kind herein referred to comprising a shell, and one or more furnace-flues composed of connected short tubes and transverse plates that are secured between the connected short tubes and have flue-openings therethrough and extend into the water-space of the generator, substantially as described.

5. A steam-generator of the kind herein referred to comprising a shell, one or more furnace-flues composed of alternately-arranged short tubes and plates, said plates being secured between said tubes and extending upward into the water-space and formed with holes corresponding to the flue or flues, and mixing and heating devices arranged within the flue or each flue behind the fire-bridge and in conductive contact with the heating-surface of the flue, substantially as described.

6. A steam-generator of the kind herein referred to comprising a shell, one or more furnace-flues composed of short tubes and transverse plates, said plates being secured between said tubes and extending upward into the water-space and formed with holes corresponding to the flue or flues, and mixing and heating devices arranged within the flue or each flue behind the fire-bridge and in conductive contact with the heating-surface of the flue, the surface of said devices nearest the fire-bridge being adapted to deflect hot gases and air coming in contact therewith outward against the wall of the flue, substantially as described.

7. A steam-generator of the kind herein referred to comprising a shell, one or more furnace-flues composed of alternately-arranged short tubes and transverse plates, said plates being secured between said tubes and extending upward into the water-space and each formed with one or more perforated portions corresponding to the flue or flues, each of said perforated portions comprising a central or hub-like part and connecting arms or bars integral with one another and with the plate, substantially as described for the purpose specified.

8. A steam-generator of the kind herein referred to comprising a shell, one or more flues composed of rings, transverse heat-conducting plates secured between said rings and formed with one or more perforated portions each comprising a central part and connecting arms or bars located within the corresponding flue, and deflecting devices fixed to said arms or bars on the furnace side thereof, substantially as described for the purpose specified.

9. A steam-generator comprising a cylindrical shell built up of annular sections, and transverse heat-conducting plates secured between the adjacent ends of said sections and dividing the interior of said shell into adjacent compartments that communicate with one another at the upper part, substantially as described.

10. A steam-generator comprising a cylindrical shell, one or more flues 3 built up of short tubes 2, and transversely-arranged perforated metal plates 1 secured between said tubes and formed with teeth or projections $1^a$ extending into the water-space, some of said plates being formed with arms or bars $4^a$ and opening $4^c$ in line with the flue, substantially as described.

11. A steam-generator comprising a cylindrical shell, one or more flues built up of short tubes 2, and transversely-arranged perforated metal plates secured between said tubes and extending upward into the water-space of the generator and some of which are formed with arms or bars $4^a$ with opening $4^c$ in line with said flue or flues, and star-shape deflecting devices 5, $5^a$ secured to said arms or bars and having outwardly-inclined deflecting-surfaces substantially as described.

Signed at No. 2 Pope's Head alley, Cornhill, London, England, this 13th day of October, 1898.

GUILLAUME ARNAUD NUSSBAUM.

Witnesses:
HUGH HUGHES,
L. M. ROWSELL.